July 6, 1965
G. W. BLOOMQUIST
3,193,069
VALVE OPERATING COUPLING
Filed April 2, 1962
5 Sheets-Sheet 2
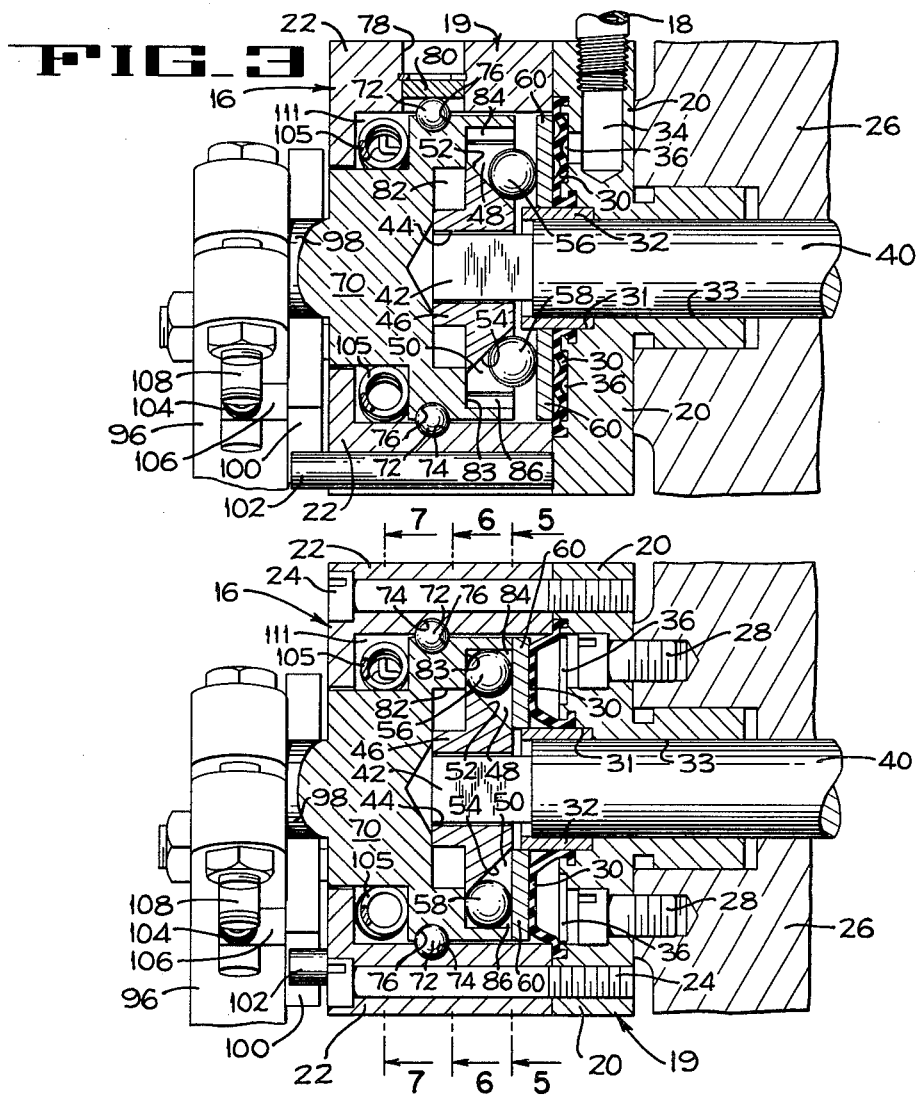
INVENTOR
GEORGE W. BLOOMQUIST
BY *Hans G. Hoffmeister*
ATTORNEY July 6, 1965 G. W. BLOOMQUIST 3,193,069
VALVE OPERATING COUPLING
Filed April 2, 1962 5 Sheets-Sheet 3
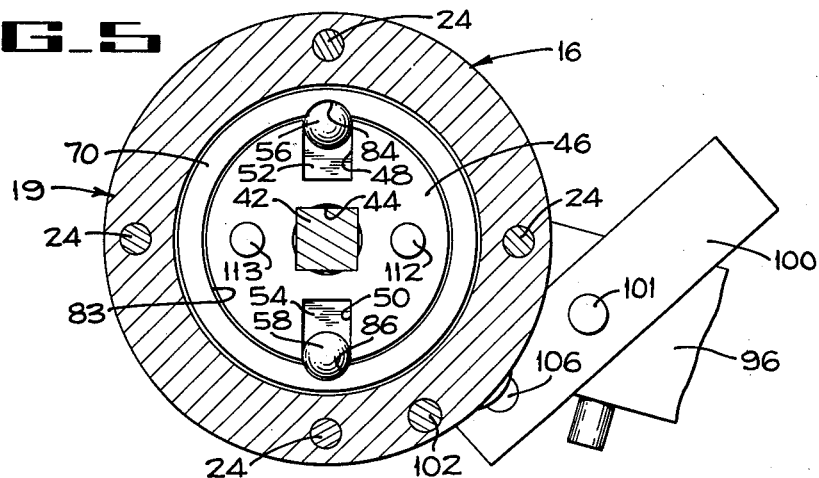
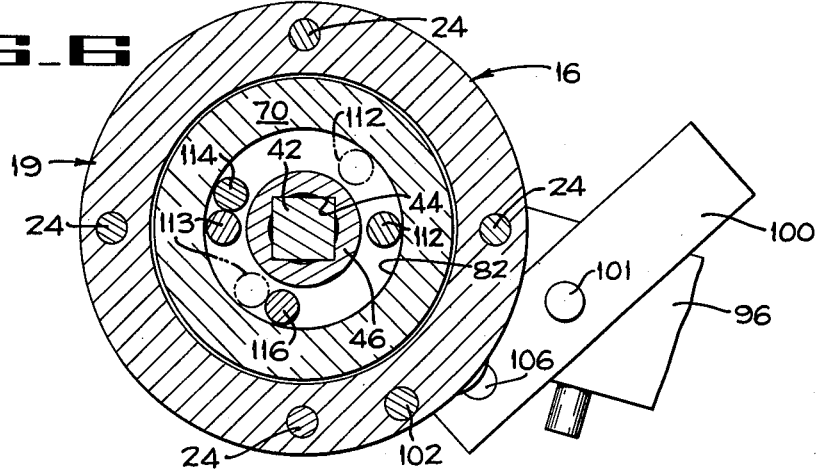
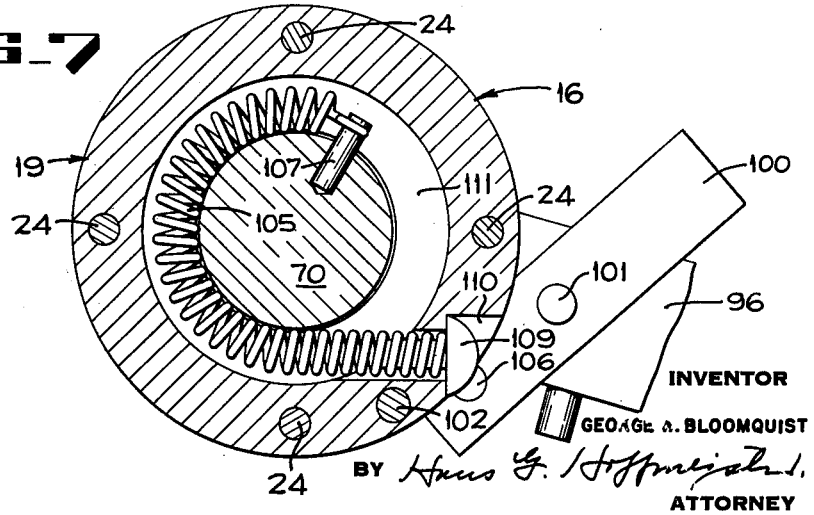
INVENTOR
GEORGE W. BLOOMQUIST
BY Hans G. Hoffmeister
ATTORNEY July 6, 1965
G. W. BLOOMQUIST
3,193,069
VALVE OPERATING COUPLING
Filed April 2, 1962
5 Sheets-Sheet 4
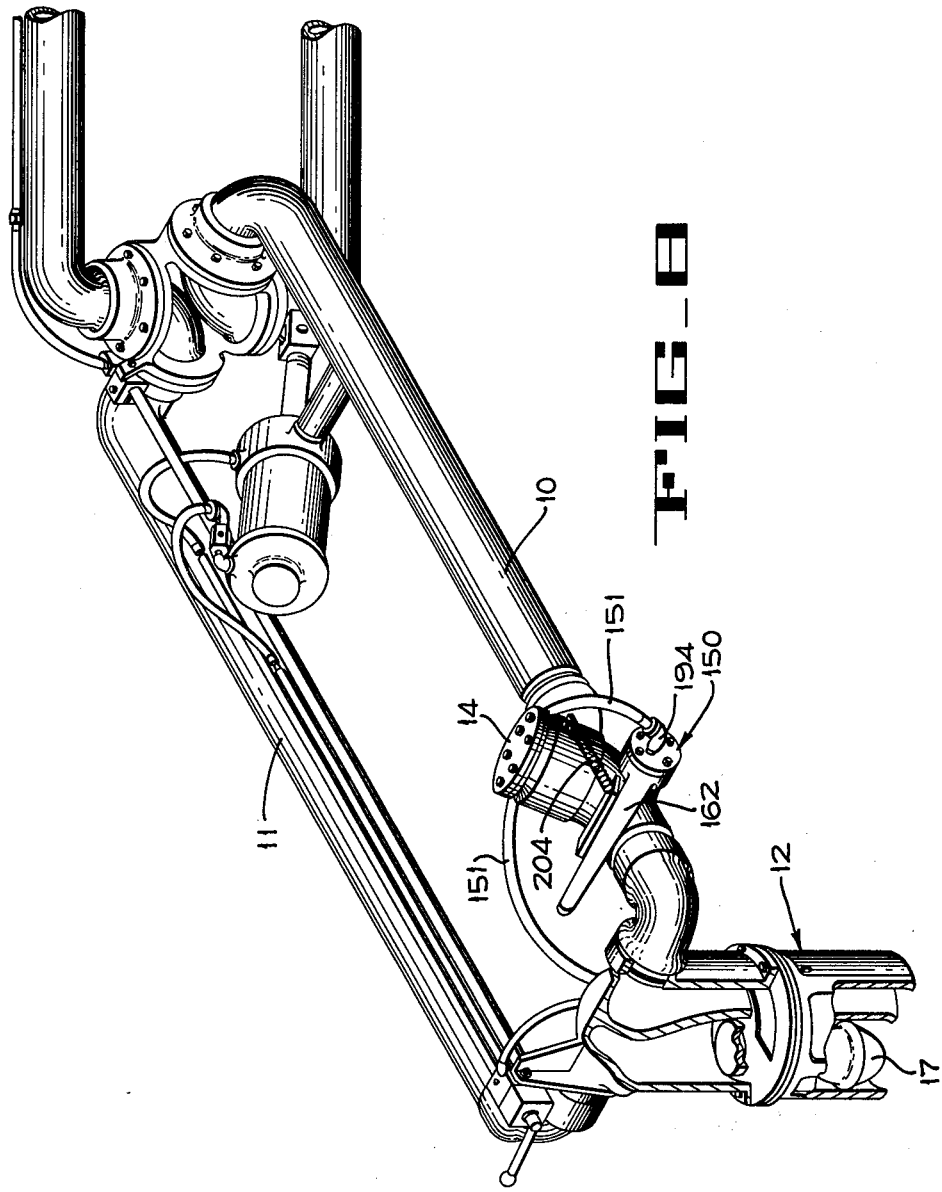
FIG_8
INVENTOR
GEORGE W. BLOOMQUIST
BY *Hans G. Hoffmeister*
ATTORNEY

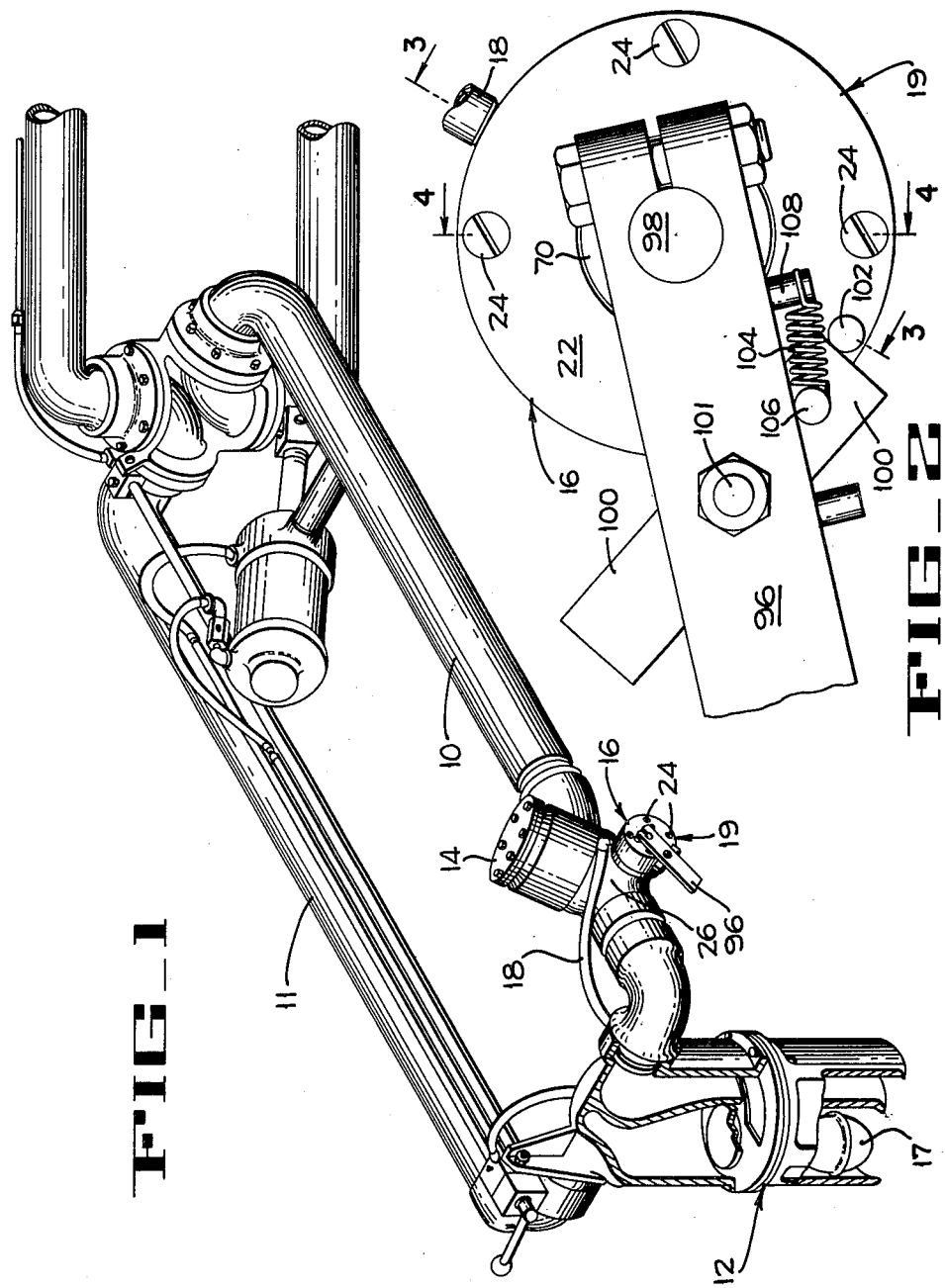

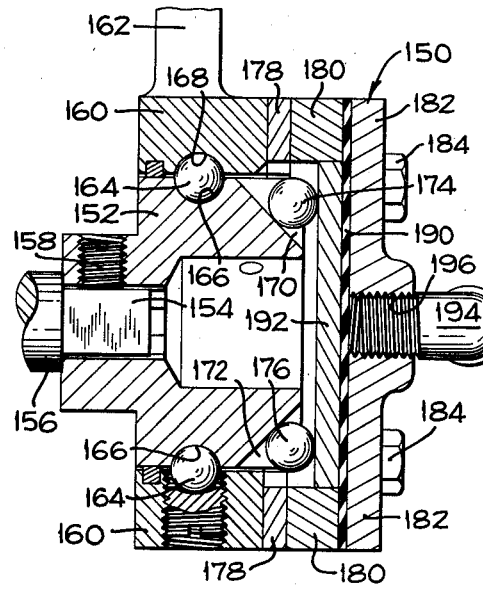
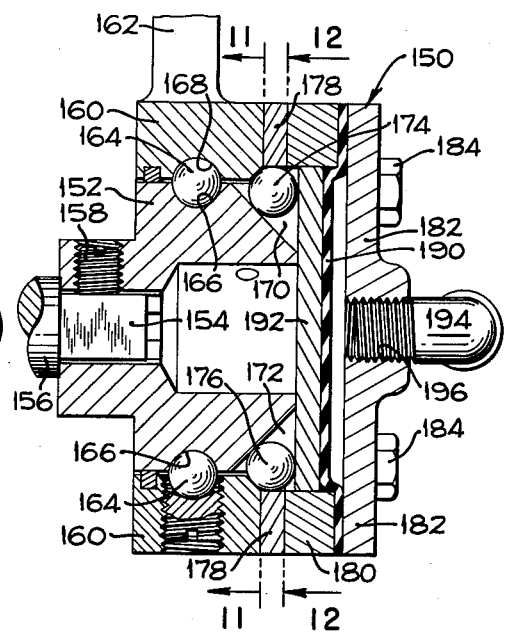
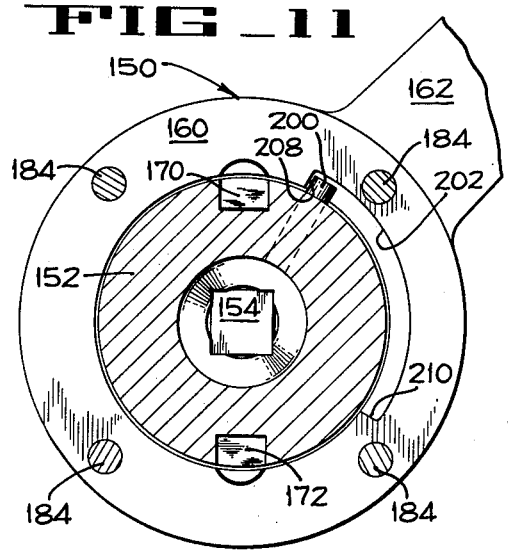
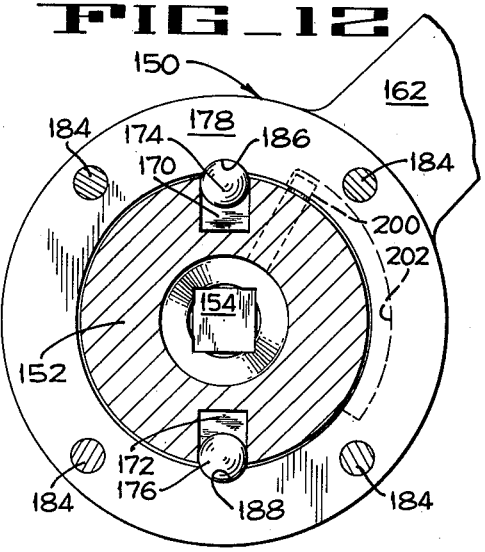

United States Patent Office 3,193,069
Patented July 6, 1965

3,193,069
VALVE OPERATING COUPLING
George W. Bloomquist, Long Beach, Calif., assignor to FMC Corporation, San Jose, Calif., a corporation of Delaware
Filed Apr. 2, 1962, Ser. No. 184,342
25 Claims. (Cl. 192—88)

This invention pertains to a coupling for the handle of a loading valve of the type used in apparatus for loading gasoline and other liquids into tank trucks.

An object of the invention is to provide an improved handle coupling structure for opening a spring closed loading valve, which will automatically disconnect to permit the valve to close when the tank is full.

Another object of the invention is to provide a handle coupling assembly which can override the automatic disconnecting mechanism to permit topping off the tank, or to permit forceful closure of a stuck valve even after the handle has been automatically disconnected from the valve.

These and other objects and advantages of the invention will be apparent from the following description taken in conjunction with the accompanying drawings, wherein:

FIG. 1 is a perspective of a liquid handling apparatus including a loading valve incorporating one embodiment of the coupling structure of the present invention.

FIG. 2 is an end elevation of the handle coupling illustrated in FIG. 1, drawn to an enlarged scale.

FIG. 3 is a diametric section taken along line 3—3 of FIG. 2.

FIG. 4 is a similar section taken on line 4—4 of FIG. 2, but with the internal parts rotated so that the section therethrough is on the same plane as FIG. 3.

FIGS. 5, 6 and 7 are transverse sections taken on line 5—5, 6—6, and 7—7, respectively, of FIG. 4.

FIG. 8 is a perspective of a liquid handling apparatus incorporating another embodiment of the handle coupling of the present invention.

FIGS. 9 and 10 are diametric sections through the loading valve handle and coupling structure illustrated in FIG. 8.

FIGS. 11 and 12 are transverse sections taken on lines 11—11 and 12—12 of FIG. 10, respectively.

The fluid handling apparatus illustrated in FIG. 1 is of the type commonly called a "loading arm." It comprises a pivotally mounted first conduit 10 for delivering liquid (e.g. gasoline) to a tank to be filled and a second conduit 11, rigid with the first conduit 10, for recovering vapors from the tank. A liquid delivery and vapor recovery head 12 is used to connect the conduits 10 and 11 to the tank. The structural details of the conduits 10 and 11 and the connecting head 12 do not constitute part of the present invention and, therefore, are not described herein. However, they are fully set forth in the application of H. W. Knight, Serial No. 69,844, and now Patent No. 3,099,297, assigned to the same assignee, to which reference may be had if desired.

The conduit 10 incorporates a loading valve 14 to control the flow of liquid therethrough. This valve 14 is of conventional construction and, therefore, does not require description herein other than the explanation that it includes a spring (not shown) that constantly urges the valve closed.

The present invention resides in a coupling assembly 16 for connecting a manually operable handle to the valve 14 whereby the valve 14 can be actuated. An air line 18 is adapted to convey pressurized air to the coupling assembly 16. The outer end of the line 18 is connected to a valve assembly (not shown) on the connecting head 12, which valve is so arranged that air pressure is applied to the line 18 only when the connecting head 12 is in tight connection with the tank to be filled, and when a float 17 within the head 12 is not lifted by liquid within the tank, i.e., when the tank is not filled, all as fully explained in the aforesaid application, Serial No. 69,844. The purpose of the air pressure in the line 18 will be explained hereinbelow.

The handle coupling assembly 16 of the embodiment of the present invention illustrated in FIGS. 1-7 comprises a two-part housing 19 (FIGS. 3 and 4) having an inner section 20 and an outer section 22 connected together by cap screws 24 (FIGS. 4-7). The inner section 20 is connected to the housing 26 of the valve 14 by cap screws 28 (FIG. 4). An annular diaphragm 30 is clamped throughout the entire extent of its outer edge between the housing sections 20 and 22, and throughout the full extent of its inner edge by a sleeve 32 centered in a counterbore 31 in a central opening 33 provided in the inner housing section 20. A radial port 34 (FIG. 3) in the periphery of the inner housing section 20 connects an annular, recessed area 36 behind the diaphragm 30 with the air line 18 which is in constant communication with the port 34.

The operating stem 40 of the valve 14 is a shaft which is rotatable with respect to the coupling housing 19, and projects through the central opening 33 of the inner housing section 20 and through the lock sleeve 32 into the hollow interior of the outer housing section 22, where its end 42 is square and is fitted within a central opening 44 of a generally cylindrical driven coupling element 46. The coupling element 46 is provided with two diametrically opposed radial slots 48 and 50 having bottom walls 52 and 54, respectively, which are inclined at approximately forty-five degrees with respect to the axis of the shaft 40. Two balls 56 and 58 are mounted one within each of the slots 48 and 50. An annular thrust plate 60 is slidably mounted 48 and 50. An annular thrust plate 60 is slidably mounted on the exterior of the lock sleeve 32 between the balls 56, 58 and the diaphragm 30.

A stepped cylindrical actuating head 70 constitutes the driving element of the coupling 16. It is rotatably mounted within the outer housing section 22 by a plurality of anti-friction balls 72 fitted in opposed annular grooves 74 and 76 in the inner wall of the housing section 22 and the peripheral surface of the coupling element 70, respectively. The balls 72 are inserted through an opening 78 (FIG. 3) in the housing section 22 which is closed by a ball retainer plug 80.

The inner end of the driving coupling element 70 (FIGS. 3 and 4) is provided with a stepped recess 82. The driven coupling element 46 is fitted within the larger part 83 of the recess 82 to rotate freely therein. However, the wall of the larger portion 83 of the recess 82 is provided with two diametrically opposed recesses 84 and 86 (FIGS. 3, 4 and 5) into which the balls 56 and 58 are adapted to be partly received to interengage the driving and driven coupling elements for conjoint rotary movement. Thus, when the balls 56, 58 are moved radially outward as shown in FIG. 4, the shaft 40 of the valve 16 is firmly connected to the head 70 to be rotated thereby, but when the balls 56, 58 are free to move radially inward clear of the recesses 84 and 86, as shown in FIG. 3, the shaft 40 can rotate relatively to the driving coupling element 70, thus permitting the valve 14 to close under the influence of its own spring (not shown).

The valve operating handle 96 is clamped to a projecting shaft 98 which is integral with the driving coupling element 70. The handle 96 carries a dog 100 (FIG. 2) pivotally mounted thereon at 101. The dog 100 is adapted to engage a pin 102 rigid with the coupling housing 19 when the handle 96 is at the normal limit of travel of the handle in the valve-opening direction. A spring 104 under tension between a pin 106 on the dog 100 and a pin 108 on the handle 96 normally retains the dog in position to engage the pin 102 in a manner preventing over-travel of the handle. When over-travel of the handle 96 is desired, as explained hereinbelow, the dog 100 may be rotated against the tension of the spring 104 so that the dog can bypass pin 102.

A spring 105 (FIGS. 3, 4 and 7) stretched around the driving coupling element 70 is under tension between a radial pin 107 (FIG. 7) mounted on the head 70 and a headed anchoring pin 109 inserted in an opening 110 which leads tangentially into an annular space 111 within the housing section 22 within which the spring 105 is accommodated. The spring 105 is the return spring which constantly resists movement of the coupling element 70 and the valve operating handle 96 in the valve opening direction.

In normal operation of the apparatus when the valve 14 is in its closed position and the handle 96 is in its fully retracted position, the recesses 84 and 86 of the driving coupling element 70 are in alignment with the slots 48 and 50 in the driven coupling element 46. When the fluid delivery head 12 is in proper engagement with the tank to be filled, pressure is supplied through the air line 18 behind the diaphragm 30 as explained in the aforesaid application Serial No. 69,844 causing the diaphragm to expand to the position illustrated in FIG. 4, thus forcing the thrust plate 60 to the left as viewed in that figure. This moves the balls 56 and 58 along the inclined surfaces 52 and 54 which cam the balls radially outward into the recesses 84 and 86 in the driving element 70 of the coupling. In this manner the driving element 70 and the driven element 46 of the coupling 16 are firmly interconnected for conjoint rotary movement. The valve 14 can then be opened by turning the handle 96.

When the tank is full and the float 17 is raised by liquid in the tank, or if the delivery head 12 should move out of contact with the tank being filled, the pressure is released from the air line 18, thus permitting the diaphragm 30 to return to its relaxed position illustrated in FIG. 3. The balls 56 and 58 thus become free to move out of engagement within the recesses 84 and 86 in driving element 70, permitting the element 46 to rotate relatively to the element 70. The self-closing loading valve 14 will then close automatically under the influence of its own spring (not shown).

A lost motion interconnection is provided between the driving and driven elements 70 and 46. This lost motion interconnection is best illustrated in FIG. 6 and comprises two pins 112 and 113 fixed to the element 46 and projecting toward the element 70, and two similar pins 114 and 116 fixed to the element 70 and projecting toward the element 46.

The pins 112 and 113, 114 and 116 are illustrated in full lines in FIG. 6 in the positions they occupy when the balls 56 and 58 interconnect the coupling elements 46 and 70 and the handle 96 is in the valve open position. If the balls 56 and 58 are released, the element 46 will rotate to the valve closed position, moving the pins 112 and 113 to the positions illustrated in broken lines. If, for any reason, the valve should fail to close, movement of the handle 96 will effect positive closure due to the interengagement of the pin 114 with the pin 113. Furthermore, topping off of the tank being filled can be effected even though air pressure behind the diaphragm 30 and the balls 56 and 58 is released, by moving the dog 100 out of alignment with the pin 102 and causing overtravel of the handle 96. This overtravel of the handle 96 causes contact of the pin 116 with the pin 113 to effect movement of the element 46 to open the loading valve 14. As a precautionary measure the parts may be so proportioned and arranged that only a partial opening, or "cracking" of the valve 14 can be effected in this manner, so as to permit only a relatively gentle and thus easily controlled flow during such topping off operation.

Since movement of the driven coupling element 46 relative to the driving coupling element 70 in the illustrated structure is restricted by the pins 114 and 116 thus limiting the rotary movement of the valve shaft 40 to approximately fifty degrees, which may in some valves be insufficient to effect full opening of the valve, more extensive relative movement of these two elements may be achieved by initially locating the pin 116 at a greater angular distance from the pin 114 to permit the desired amount of relative angular movement.

The embodiment of the invention illustrated in FIGS. 8–12 is likewise attached to the control valve 14 (FIG. 8) in the conduit 10 to control the flow to the delivery head 12. Again the valve (not shown) which is responsive to contact of the delivery head with the tank dome, and the valve (not shown) which is responsive to the raising of the float 17 by liquid in the tank, controls the air pressure within the air line 151 which is connected to the coupling assembly 150.

The coupling assembly 150 comprises a driven coupling element 152 (FIGS. 9–12) fixed to the squared outer end 154 of the rotatable valve stem 156 and secured thereon by a set screw 158.

The hub 160 of a handle 162 comprises the driving element of the coupling 150. It is rotatably mounted on the driven element 152 by means of a plurality of antifriction balls 164 received within opposed grooves 166 and 168 formed on the peripheral surface of the driven element 152 and the inner wall of the hub 160, respectively. The driven element 152 is provided with two diametrically opposed diagonal slots 170 and 172, and two balls 174 and 176 are mounted one within each of the diagonal slots 170 and 172. A latch ring 178 and a spacer ring 180 are clamped to the hub 160 by a cover plate 182 and four cap screws 184. The latch ring 178 is provided with two opposed recesses 186 and 188 in its inner peripheral surface into which the balls 174 and 176 are adapted to be received. A flexible diaphragm 190 is clamped between the cover plate 182 and the spacer ring 180. A thrust plate 192 is received within the spacer ring 180 and is slidable relative thereto. An elbow 194 is threaded into a central aperture 196 in the cover plate 182 and is connected to the air line 151.

Since in this embodiment, the part of the coupling assembly 150 to which the air line 151 is attached rotates when the handle 162 is turned, the air line 151 should be a flexible hose, as shown in FIG. 8, or, alternatively should be connected to the cover plate 182 by means of a suitable swivel joint (not shown).

When air is admitted from the line 151 to the area behind the diaphragm 190 the diaphragm is moved to the left from the position illustrated in FIG. 9 to that illustrated in FIG. 10 and moves the thrust plate 192 to force the balls 174 and 176 along the inclined slots until they are thrust radially into the recesses 186 and 188 in the latch ring 178. When the balls are engaged within the recesses 186 and 188 the hub 160 is engaged with the cylindrical element 152 so that when the handle 162 is moved in the valve opening direction it will rotate the cylindrical element 152 and thus the valve shaft 156 to open the valve. If, for any reason, the air pressure should be released from the air line 151, either by the head 12 breaking contact with the tank dome, or by liquid within the tank lifting the float 17 within the delivery head 12, the diaphragm 190 and the thrust plate 192 will return to the positions illustrated in FIG. 9 thus freeing the balls from the recesses 186 and 188 permitting the driven element 152 to rotate relatively to the handle hub 160 and thus permitting the valve 14 to close without requiring movement of the operating handle 162.

As in the previously described embodiment, a lost motion connection is provided between the driving and driven elements 160 and 152, respectively of the coupling 150. It comprises a pin 200 which projects radially from the driven element 152 and is received within a slot 202 formed within the inner circumferential surface of the driving element 160, as illustrated in FIG. 11. A handle return spring 204 (FIG. 8) is connected between the actuating handle 162 and the body of the valve 14 to return the actuating handle 162 to its valve closed position. A safety chain (not shown) extends through the coil spring 204 and is similarly connected to the handle 162 and the body of the valve 14 to limit the motion of the handle 162 in the valve opening direction.

If, for any reason, the valve should fail to close when the balls 174 and 176 are released, closing movement of the valve actuating handle 162 will cause the end wall 208 of the slot 202 to engage the pin 200 and thus force the valve to its closed position. If it is desired to top off the tank after the air pressure in the line 151 has been cut off by the action of the float 17, the safety chain may be disconnected from the main valve body and the handle 162 moved in the valve opening direction until the pin 200 contacts the opposite end wall 210 of the groove 202 permitting the valve to be cracked by overtravel of the handle 162.

While certain embodiments of the invention have been described herein, it should be noted that various changes may be made therein without departing from the spirit of the invention as defined in the appended claims.

The invention having thus been described what is believed to be new and desired to be protected by Letters Patent is:

1. A valve operating coupling comprising a driven coupling element fixed to a rotatable stem of a self closing valve, a driving coupling element coaxial with said driven coupling element in rotative relation thereto, a handle fixed to said driving coupling element, one of said coupling elements having opposed inclined slots formed in its end face, the other of said coupling elements having opposed ball receiving recesses therein, a ball mounted within each of said slots for operably interconnecting said first and second coupling elements, a fluid pressure actuated operator mounted adjacent said driven coupling member for applying external force to said balls, to move said balls along the inclined slots into said recesses, and a lost motion interconnection between said coupling elements to effect movement of said driven coupling element by overtravel of said driving coupling element while the balls are removed from said recesses.

2. A coupling as set forth in claim 1 wherein said lost motion interconnection comprises a pin fixed to one of said coupling elements and projecting therefrom into an arcuate slot formed in the other of said coupling elements.

3. A coupling as set forth in claim 1 wherein said lost motion interconnection comprises axially disposed pins in said driven coupling element projecting toward said driving coupling element, and axially disposed pins in said driving coupling element projecting toward said driven coupling element and adapted to interengage the pins thereon.

4. A valve operating coupling comprising a coupling housing adapted to be fixed to a valve housing of a self closing valve, a first coupling element within said coupling housing and fixed to a rotating stem of said self closing valve, a second coupling element rotatably mounted in said coupling housing, a handle fixed to a portion of said second coupling element which projects from said housing, said first coupling element having opposed inclined slots formed therein, said second coupling element having opposed ball receiving recesses therein, a ball mounted within each of said slots for operably connecting said first and second coupling elements, a diaphragm clamped in said housing adjacent said second coupling element, a thrust plate mounted between said diaphragm and said balls, whereby fluid pressure applied to said diaphragm will move said thrust ring to force said balls along said inclined slots into said recesses, and a lost motion interconnection between said coupling elements which becomes operative to rotate said first coupling element upon overtravel of said second coupling element when said balls are released from said recesses.

5. A valve operating coupling as set forth in claim 4 wherein said lost motion interconnection comprises interengaging axially disposed pins fixed to said first and second elements, respectively.

6. A valve operating coupling comprising a first coupling element fixed to a rotating stem of a self closing valve, a second coupling element rotatably mounted on said first coupling element, a handle fixed to said second coupling element, said first coupling element having opposed inclined slots formed in its end face, a first ring clamped to said second coupling element and having opposed ball receiving recesses therein, a ball mounted within each of said slots for operably connecting said first and second coupling elements, a spacer ring clamped to said first ring, a pressure disc slidably mounted within said spacer ring, a diaphragm clamped to said spacer ring by a cover plate, means for introducing air pressure through said cover plate to displace the diaphragm and move said pressure disc to force said balls along said inclined slots into said recesses, and a lost motion interconnection between said first and second coupling elements to effect movement of said first coupling element upon overtravel of said second coupling element when said balls are released from said recesses.

7. A coupling as set forth in claim 6 wherein said lost motion interconnection comprises a radially disposed pin in said first coupling element projecting into an arcuate slot in said second coupling element.

8. A valve operating coupling comprising a first coupling element fixed to a rotatable stem of a self-closing valve, a second coupling element coaxial with said first coupling element in rotative relation thereto, a handle fixed to said second coupling element, one of said coupling elements having opposed inclined slots formed therein, the other of said coupling elements having opposed ball receiving recesses therein, balls mounted one within each of said slots for operably interconnecting said first and second coupling elements, a thrust plate substantially normal to the axis of said stem and movably mounted adjacent to and in engagement with said balls, a flexible diaphragm mounted adjacent to said thrust plate, means for applying fluid pressure to said diaphragm to urge said thrust plate against said balls and toward said slots and thereby force said balls along said slots into said recesses.

9. A valve operating coupling comprising a first coupling element fixed to a rotating stem of a self-closing valve, a second coupling element rotatably mounted on said first coupling element, a handle fixed to said second coupling element, said first coupling element having opposed inclined slots formed therein, a first ring clamped to said second coupling element and having opposed ball receiving recesses therein, a ball mounted within each of said slots for operably connecting said first and second coupling elements, a spacer ring clamped to said first ring, a pressure disc slidably mounted in said spacer ring in engagement with said balls, a diaphragm clamped to said spacer ring by a cover plate, and means for introducing air pressure through said cover plate to displace said diaphragm and move said pressure disc toward said first element and against said balls to force said balls along said inclined slots into said recesses.

10. A valve operating coupling comprising first and second coupling members mounted in coaxial and rotatable relation to each other, said second member having a peripheral surface confronting said first member, said second member having a radial end surface, said second member also having a slot extending between said end and peripheral surfaces, said slot having a bottom wall lying in a plane that obliquely intersects the common axis of the coupling members, said first coupling member having a recess facing said peripheral surface and being registrable with said slot upon rotation of said members relative to each other; a ball in said slot, said ball being movable along said bottom wall between a coupling position projecting partially into said slot and partially into said recess and a retracted position withdrawn inward of said peripheral surface; and means movable relatively to said second member for engaging and moving said ball into its coupling position or allowing said ball to move into its retracted position.

11. The coupling of claim 10 wherein said slot extends through said second member and opens outward from said end and peripheral surfaces, and wherein said ball-moving means is mounted in confronting relation to said end surface and is movable toward and away from said end surface when it moves said ball into its coupling position or allows said ball to move into its retracted position.

12. The coupling of claim 10 wherein said ball-moving means includes a thrust plate and means mounting said plate in confronting relation to and in engagement with the ball for movement toward and away from said slot.

13. The coupling of claim 10 wherein there are a plurality of slots individually registering with a plurality of recesses, wherein there is a ball in each slot, and wherein the ball-moving means includes a thrust plate substantially normal to said common axis, in engagement with said balls, and movable toward and away from said slots.

14. The coupling of claim 10 including means releasably limiting rotatable movement of said first coupling member about said axis.

15. The coupling of claim 10 including lost motion interconnecting means between said members for enabling movement of one of said members by the other member when said ball is in its retracted position.

16. The coupling of claim 15 wherein said lost motion means includes a pair of pins projecting from said first coupling member in spaced relation to each other and substantially parallel to said common axis, and a third pin projecting from said second coupling member between said pair of pins.

17. The coupling of claim 15 wherein said lost motion means includes an arcuate slot in said first coupling member, said slot being concentric with said axis and facing the peripheral surface of said second coupling member, and a pin projecting radially from said second member into said arcuate slot.

18. A coupling for use in operating a valve comprising a first coupling member having an internal wall circumscribing an axis of rotation, said wall having a recess therein facing inward toward said axis; a second coupling member having an outer wall circumscribing an axis of rotation for said second member; means mounting said coupling members in coaxial relation with each other with said outer wall circumferentially spaced inward of and confronting said internal wall and so that axial movement of said members relative to each other is precluded, said second member having a radial end surface and a slot opening through said outer wall and said end surface, said slot and recess being registrable upon relative rotation of said members, said slot having a generally outwardly facing bottom wall extending from said end surface to said outer wall in oblique relation to said axis; a rigid ball positioned in said slot and being movable along said bottom wall between a coupling position extending partially in said recess and partially in said slot whereby said members are unitarily rotatable, and a retracted position withdrawn inward of said outer wall; and means movable axially with respect to both of said members for engaging and moving said ball into its coupling position and allowing said ball to move into its retracted position.

19. A coupling for use in operating a valve comprising a first coupling member having an internal wall circumscribing an axis of rotation, said wall having circumferentially spaced arcuate recesses therein facing inward toward said axis; a second coupling member having an outer wall circumscribing an axis of rotation for said second member; means mounting said coupling members in coaxial relation to each other with said outer wall circumferentially spaced inward of and confronting said internal wall and so that axial movement of said members relative to each other is precluded, said second member having a radial end surface and slots opening through said outer wall and said end surface, said slots being spaced from each other by distances corresponding to the distances between said recesses whereby said slots and said recesses are registrable upon relative rotation of said members, each slot having a generally outwardly facing bottom wall extending from said end surface to said outer wall in oblique relation to said axis; rigid balls individually positioned in said slots and being movable along said bottom walls between coupling positions extending partially in their respective recesses and partially in their respective slots whereby said members are unitarily rotatable, and retracted positions withdrawn inward of said outer wall; and means movable axially with respect to both of said members for engaging and moving said balls into their coupling positions and allowing said balls to move into their retracted positions.

20. A valve operating coupling comprising a driven coupling element, a driving coupling element coaxial with said driven coupling element in rotative relation thereto, one of said coupling elements having inclined slots formed in its end face, the other of said coupling elements having ball-receiving recesses therein respectively confronting the slots in said one coupling element, a ball mounted within each of said slots for operatively interconnecting said first and said second coupling elements, a fluid pressure actuated operating means mounted adjacent to said driven coupling member for applying external force to said balls thereby to move said balls along the inclined slots into said recesses, and a lost motion interconnection between said coupling elements to effect movement of said driven coupling element by said driving coupling element when the balls are removed from said recesses.

21. A coupling comprising a first coupling member having an axis of rotation, an end face disposed transversely of said axis, and a slot having a bottom wall that is located in a plane obliquely intersecting said end face and said axis, said slot having an inner end adjacent to said end face and an opposite outer end, said plane and said axis diverging away from each other in a predetermined direction extending from said inner end to said outer end of the slot; a second coupling member having a recess therein and having an axis of rotation; means mounting said coupling members in coaxial relation for rotation about their common axis and with said recess registrable with the outer end of said slot upon relative rotation between said members; a rigid ball in said slot, said ball being movable along the bottom wall between a coupling position partially projecting from said outer end of the slot into said recess and a retracted position withdrawn from said recess into the slot; and means movable relatively with respect to said members and engaging said ball for moving the ball along said bottom wall into said coupling position and for holding said ball in said coupling position, said means also being movable to allow said ball to move into its retracted position.

22. The coupling of claim 21 including means precluding relative axial movement between said coupling members.

23. The coupling of claim 21 including a stem connected to said first coupling member and projecting away from the end face thereof in a direction opposite to said predetermined direction, and wherein said ball moving means includes an annular thrust plate concentrically surrounding said stem and slidable axially thereof, said plate being in engagement with said ball.

24. The coupling of claim 21 including a stem connected to said first coupling member in coaxial relation therewith and projecting away from said coupling member in said predetermined direction, and wherein said ball moving means includes a thrust plate substantially normal to said common axis and confronting said end face, said thrust plate being in engagement with said ball and being movable axially toward and away from said end face.

25. The coupling of claim 21 wherein said second coupling member has a wall concentrically circumscribing said first coupling member, wherein said recess is located in said wall and has a concave shape, and wherein said ball is spherical and is complementarily received in said recess in said coupling position.

References Cited by the Examiner

UNITED STATES PATENTS

| | | | |
|---|---|---|---|
| 2,437,737 | 3/48 | Halby. | |
| 2,514,227 | 7/50 | Dodge | 192—56 X |
| 2,772,578 | 12/56 | Kling. | |
| 2,792,919 | 3/57 | Klaue | 192—96 X |
| 2,891,644 | 6/59 | Davis | 192—88 |
| 3,005,525 | 10/61 | Phillips | 192—30 |
| 3,050,321 | 8/62 | Howe et al. | 192—38 X |

FOREIGN PATENTS 3,773  1898  Great Britain.

DAVID J. WILLIAMOWSKY, *Primary Examiner.*

THOMAS J. HICKEY, ROBERT C. RIORDON,
*Examiners.*